Nov. 14, 1944.  C. D. AUSTIN  2,362,790
DEVICE FOR TAKING STEREOSCOPIC PICTURES
Filed May 11, 1942
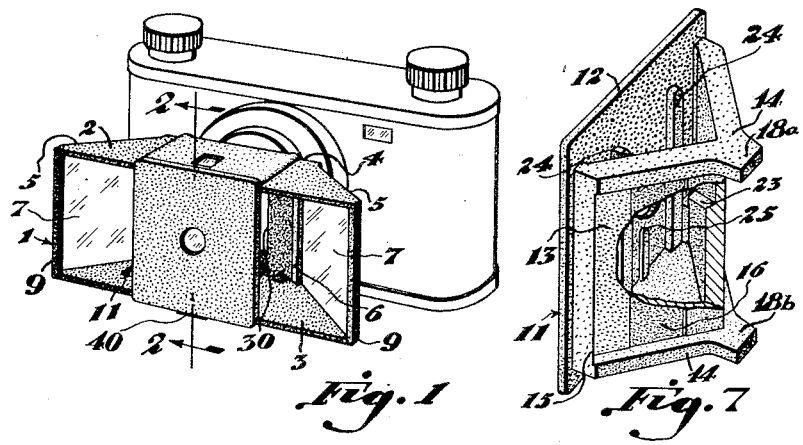
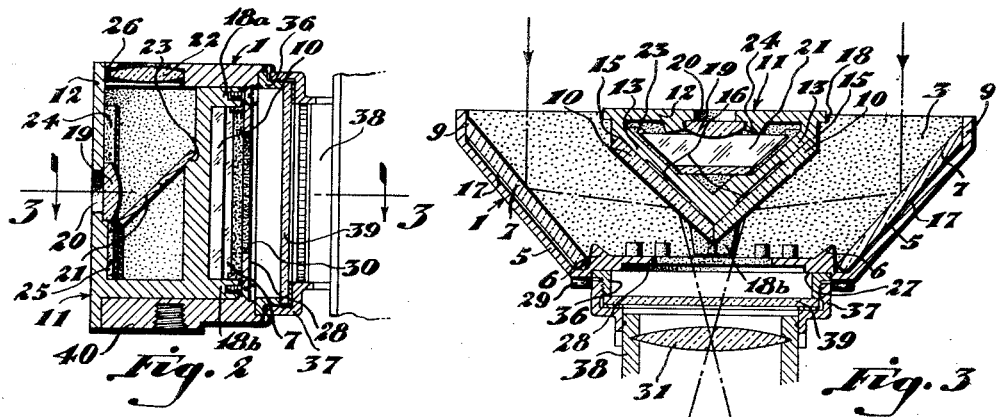
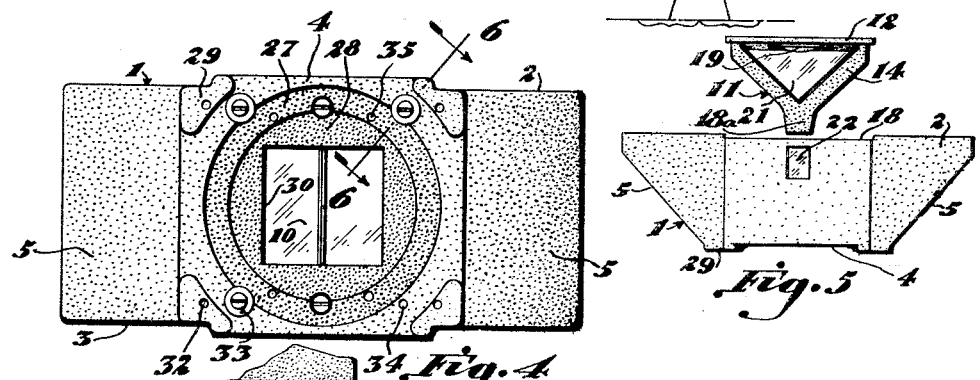
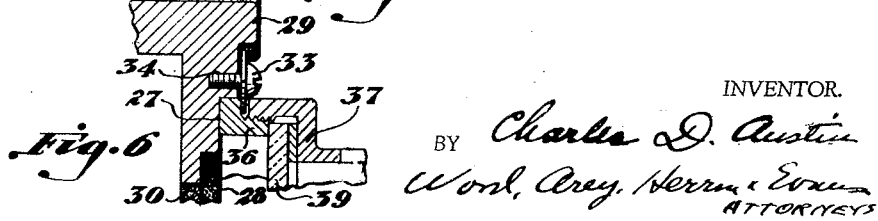
INVENTOR.
Charles D. Austin
ATTORNEYS Patented Nov. 14, 1944

2,362,790

UNITED STATES PATENT OFFICE 2,362,790

DEVICE FOR TAKING STEREOSCOPIC PICTURES

Charles D. Austin, Cincinnati, Ohio

Application May 11, 1942, Serial No. 442,419

5 Claims. (Cl. 88—1)

This invention relates to a device or attachment for enabling stereoscopic pictures to be taken with a camera having a single lens. The device is intended for use in conjunction with professional and amateur cameras, snapshot cameras, the so-called miniature or candid cameras or the like, and also for use in conjunction with movie camera equipment.

This application is a continuation-in-part of my copending patent application Serial No. 279,144 filed June 14, 1939, and now issued as United States Patent No. 2,299,002, dated October 13, 1942, and the objective of the present invention, briefly, has been to provide a simplified two-piece apparatus for taking stereoscopic pictures by means of a single lens camera, and also has been to provide simplified means for enabling the apparatus to be attached to or mounted on the camera by means of a conventional so-called Wratten ring commonly used by photographers for holding a light filter.

Briefly, from the optical point of view, the device of the present invention consists of pairs of mirrors mounted within a casing and arranged relatively to one another to so direct light from the subject through the lens of a camera before which it is mounted and onto the film of the camera that two images, arranged in stereoscopic relationship to one another, are provided, instead of the single non-stereoscopic picture taken with a camera in the usual way.

Since it is desirable to use the camera under certain circumstances for taking non-stereoscopic pictures and under other circumstances for taking stereos, it is desirable that means be provided for effecting this conversion in a simple and convenient manner. In accordance with the present invention Wratten rings of the kind commonly used for holding Wratten filters are used for this purpose. These rings are well known to photographers, and are available in photographic stores. A Wratten ring comprises two pieces which are threadedly engageable with one another so as to hold a filter therebetween and one of the rings additionally has a skirt which is slotted radially at spaced intervals so as to enable its diameter to be adjusted in order that it may be held frictionally on the lens barrel of the camera.

In accordance with the present invention the rear part of the stereo apparatus is provided with at least one annular recess having a diameter complementary to that of the cap or male portion of the Wratten ring. Screws are so located about this recess that the heads of them may overlap the recess and thus clamp the male portion of the Wratten ring into the recess. The female portion of the Wratten ring, that is, the part having the expansible skirt for engagement with the lens barrel of the camera, is then attached to the male portion with or without a filter as the need may be, and the skirt is fixed to the camera lens so as to provide a firm support for the stereo device. The attachment readily may be dismounted from the camera when non-stereo pictures are to be taken simply by slipping the skirt from the camera lens barrel.

Wratten rings are available in various sizes or diameters to accommodate lens barrels of various diameters, and, in the preferred structure, instead of one recess capable of receiving only one Wratten ring, a number of recesses of differing diameter are provided, all arranged concentrically with respect to one another. At each recess or seat threaded bores are provided for receiving screws to fasten a Wratten ring located in the recess or seat of next smaller diameter.

From the structural point of view, the present apparatus contemplates a trough-like box having end walls arranged in diverging relationship so that reflectors may be mounted in a suitable manner to the inner faces of them. The outer or front face of the casing is open and an aperture through which light passes to the camera lens is provided in the rear wall; a V-shaped unit is arranged to fit between the top and bottom walls of the casing and intermediate the side walls so as to form therewith two light passageways which converge toward the rear aperture. The walls of the central unit are formed to receive reflectors and the latter cooperating with the end wall reflectors so as to direct light entering the apertures at the opposite sides of the central unit backwardly through the casing, through the back aperture and to the camera lens for the formation of images in stereoscopic relationship.

In the preferred structure the central or V-shaped unit is hollow, and an aperture is located centrally in the front of it. Within the hollow area a mirror is located at an angle to deflect light entering the central aperture upwardly to a lens. A second lens provided behind the front aperture cooperates with the latter lens to provide a view finder which designates the field of the picture taken through the stereo attachment.

Having these principles of construction in mind a preferred embodiment of the present invention is shown in the drawing in which:

Figure 1 is a perspective view showing the device installed upon a so-called miniature camera.

Figure 2 is a cross sectional view taken on the line 2—2 of Figure 1.

Figure 3 is a cross sectional plan view taken on line 3—3 of Figure 2.

Figure 4 is a rear elevation of the device.

Figure 5 is a diagrammatic plan view showing the assembly of the casing and the central V-shaped member.

Figure 6 is a cross sectional view taken on the line 6—6 of Figure 4.

Figure 7 is a perspective view showing the central support unit.

The casing of the device is indicated generally at 1 and comprises a top wall 2, a bottom wall 3, a back wall 4 and end walls 5—5. The end walls 5 diverge from the back wall 4 and are interconnected with the top and bottom members 2 and 3. In the preferred structure the casing made up of these members is formed by plastic moulding.

Lugs 6—6 extend along the back wall intermediate the top and bottom walls at points adjacent the convergence of the end walls with the back wall. These lugs provide seats for the rearward vertical edges of reflectors 7. In the preferred construction these lugs are elongated so as to extend inwardly beyond the faces of the reflectors so that their forward edges constitute light masks which function to provide a relatively sharp line between the stereoscopic images provided on the camera film. Otherwise there is apt to be some overlapping of the images which may interfere with the stereoscopic vision when pictures made from the images are viewed through a stereoscopic viewer. At the forward face of the device the side walls are configurated so as to approach the front edge at right angles approximately, thereby providing wall portions 9—9. The forward vertical edges of the reflectors 7 are so chamfered, that, with their rear edges seated against the lugs 6, the forward vertical edges rest against the inner faces of the walls 9—9. Reflectors 7 preferably are of the surface reflective type and are fastened in place by means of adhesive.

The central support member 11 comprises a front wall 12 and side walls 13 which converge rearwardly from the front wall. At the top and bottom of the side walls 13 of the central unit ribs 14 project outwardly so as to overhang and underlie the reflectors 10 which are located therebetween, while longitudinal ribs 15 extend intermediate the ribs 14 and project outwardly from the walls 13 at the front face of the central support. The reflectors 10 have their forward edges seated against the shoulders provided by the front ribs 15. The rearward edges of the reflectors 10 are chamfered so as to fit together in a mitre joint at the back part of the unit.

It is to be observed that slight grooved depressions 16 are provided vertically in the walls 13 of the central unit while similar grooves or depressions 17 extend in a horizontal direction in the end walls 5 of the casing. The lands provided in the respective walls at the opposite sides of these grooves enable the reflectors to be seated firmly and flatly while the grooves themselves provide space in which adhesive may be deposited for holding the reflectors in place.

Front face 12 of the central member extends beyond the body portion thereof while recesses 18, slightly greater in width than the width of the front face 12, are provided at the front edges of the top and bottom members 2 and 3 of the casing. Thus the central unit may be slid into the casing and be located in accurately predetermined position by seating the casing in the edge recesses. This improvement simplifies the problem of obtaining the desired accuracy in the assembly of the unit. Bosses 18a project rearwardly from the back portion of the central unit near the top and bottom faces; the length of these bosses is such that the faces of them abut the inside face of the back wall 4 and screws 18b pass through bores in the back wall into threaded engagement with the bosses, whereby the central unit is fastened against withdrawal from the casing.

The view finder

The walls 13 of the central unit 11 together with the front face thereof define a triangular cavity extending from the top to the bottom of this part of the apparatus and the members of the view finder of the apparatus are located in this area. Thus, a lens 19 is located behind an aperture 20 in the front face 12 of the central unit. A mirror 21 is positioned angularly behind the lens 19 to direct light upwardly and a second lens 22 is supported at the top part of the casing beneath an aperture which is proportioned to indicate the field of view of the stereo device.

In more detail the walls 13, in conjunction with the front wall 12, define a triangular aperture extending from top to bottom of this portion of the apparatus. At the inner faces of the walls 13 ledges 23 are provided (see Figure 3). These ledges extend angularly downwardly from the point of convergence of the walls 13 toward the bottom of the hollow cavity at the front face, at approximately a 45° angle. The triangular reflector 21 configurated to fit within the walls is seated on these ledges, its front edge being supported by longitudinal ribs 24 which are located at the inner face of the front wall at opposite sides of the aperture 20.

Ribs 24 are turned inwardly toward one another so as to constitute a dovetail groove therebetween. Lens 20 is preferably a round lens, its peripheral edge being so configurated as to fit frictionally within the dovetail groove in order that it might be held firmly behind the aperture 19. The lens is prevented from dropping down below the aperture 19 by abutment with the upper part of boss 25.

To receive the upper lens 21 the central portion of the top wall 4 of the casing is preferably made so as to be of increased thickness. A recess 26 extends from the inner face of this wall backwardly and the edges of this recess likewise are of dovetail or lipped formation. Lens 21 is seated in this recess and is held in position by the front face 12 of the central unit.

The mounting structure

Back wall 4 of the casing is sufficiently thick to accommodate a series of annular recesses; in the drawing these are designated 27—28, while a third recess, larger than the recess 27, is delineated by the bosses 29 projecting rearwardly from the back wall at its corner portions. Centrally within the recess of smallest diameter the aperture 30 is provided to permit the passage of light through the device to the camera lens which is indicated diagrammatically at 31 in Figure 3. Threaded bores 32 are located in the corner bosses 29 so that the heads of screws 33 inserted in these bores overlie the recess for clamping engagement with a Wratten ring located therein. Similarly, bores 34 are so positioned in this latter recess that screw heads may overlie the recess 27. Likewise, bores 35 are provided at spaced intervals within and close to the border of recess 27 to permit the heads of screws threaded into them to overlie the recess 28. The bores 32, 34 and 35 preferably are provided at spaced intervals about the periphery of each recess.

A typical Wratten ring, as shown in Figure 3, comprises a male element 36 and a female element 37 which is arranged for threaded engagement with the male element and which itself terminates in an expansible skirt as previously described. The skirt is arranged for frictional engagement with the lens tube of the camera as illustrated diagrammatically at 38. The skirt portion of the ring is of lesser diameter than the threaded portion so as to provide an annular shoulder. A filter seated on this shoulder may be clamped in position by the male element; this is the use for which the Wratten ring is ordinarily intended and it is to be observed that filters may be used in the taking of stereoscopic pictures with the present apparatus. Heretofore this has not been possible with existing devices.

In the preferred structure the concentric recesses 27—28 and the outermost one delineated by the bosses 29 preferably are of such diameter as to receive the male elements of the Wratten rings 2, 6, and 7, respectively, inasmuch as these rings will fit almost all conventional hand cameras. Thus, as shown in Figure 3, the male element of a Series 6 Wratten ring is located in the recess 28 with the heads of the screws 33 overlapping the peripheral flange portion of this element of the Wratten ring and thereby clamping it to the stereo device. The female element, with the filter 39 contained within it, is threadedly attached thereto and the skirt portion is frictionally mounted on the lens barrel of the camera.

The bosses 29, extending forwardly from the inner face of the back wall of the casing, are provided to accommodate the bored holes into which the screws 33 may be located. The bottom wall of the casing also is provided with a lug 40 having a bore therein for a tripod screw. When the lens barrel of the camera being used is such that a Wratten ring is not available to fit it a bracket slotted so as to straddle the lug may be clamped to the attachment with the opposite end of the bracket mounted upon the camera itself as shown in the aforesaid copending patent application.

Having described my invention, I claim:

1. In a device of the class described having a wall member containing an aperture and pairs of reflectors mounted therein for directing light through the aperture to cause the formation of images in stereoscopic relationship upon the film of a camera before the lens of which the device is mounted, means for attaching said device onto the lens barrel of the camera, means in said wall member containing said aperture delineating a recess surrounding said aperture, the said recess being of such diameter as to receive one member of a Wratten ring, and clamp means threadedly carried by said wall member at spaced intervals about said recess for clamping the ring member therein, with said Wratten ring having a cooperating member arranged frictionally to fit the lens barrel of a camera.

2. A device of the class described, comprising a casing having top and bottom wall members and diverging end walls, reflectors mounted on said end walls, a V-shaped unit arranged to fit between the top and bottom wall members intermediate said end walls, said V-shaped unit having reflectors at its opposite faces for cooperation with said reflectors on said end walls to direct light through said casing for the formation of stereoscopic images upon a film therebehind, at least one of said top and bottom wall members being recessed to receive a portion of said V-shaped member for locating the V-shaped member in predetermined position with respect to the reflectors carried on said end wall members.

3. A device of the class described, comprising a casing having top and bottom wall members, a back wall member having an aperture therein and diverging end wall members, reflectors mounted on said end walls, a V-shaped unit arranged to fit between the top and bottom wall members intermediate the end walls, the said V-shaped unit having reflectors at its opposite faces for cooperation with the reflectors on said end walls to direct light through the casing and the aperture in the back wall for the formation of stereoscopic images upon a film therebehind, the V-shaped unit having lugs provided at the rearward apex of the V for abutment with the inward face of the back wall and means for fastening the V-shaped unit to the casing through said lugs.

4. A device of the class described, comprising a casing having top and bottom wall members, a back wall member having an aperture therein and diverging end wall members, reflectors mounted on said end walls, a V-shaped unit arranged to fit between the top and bottom wall members intermediate the end walls, the said V-shaped unit having reflectors at its opposite faces for cooperation with the reflectors on said end walls to direct light through the casing and the aperture in the back wall for the formation of stereoscopic images upon a film therebehind, the V-shaped unit having lugs provided at the rearward apex of the V for abutment with the inward face of the back wall and means for fastening the V-shaped unit to the casing through said lugs, at least one of the said top and bottom wall members being recessed to receive a projecting portion at the front of the V-shaped member for locating the V-shaped member in predetermined position with respect to the reflectors carried by the end walls.

5. A stereo device of the class described, comprising a casing having a back wall member containing an aperture therein, cooperating pairs of reflectors mounted within said casing for directing light from the front of said casing through the aperture in the back wall member for the formation of stereoscopic images upon a film in a camera arranged behind said back wall aperture, the said back wall aperture being surrounded by a plurality of recesses arranged in stepped relationship concentrically about the back wall aperture and one another, said recesses being of differing diameter with each dimensioned to receive a given Wratten ring and having threaded bores respectively positioned about its periphery, whereby portions of the heads of screws threaded into said bores overlie the peripheries of the respective recesses for clamping engagement upon Wratten rings installed respectively therein.

CHARLES D. AUSTIN.